United States Patent Office 3,456,025
Patented July 15, 1969

3,456,025
PREPARATION OF DIFLUOROALKENES
Lloyd E. Gardner, Bartlesville, Okla., assignor to Phillips
Petroleum Company, a corporation of Delaware
No Drawing. Filed Dec. 3, 1965, Ser. No. 511,349
Int. Cl. C07c 17/34, 17/24
U.S. Cl. 260—653.5                                5 Claims

ABSTRACT OF THE DISCLOSURE

Difluoroalkenes having the formula $R_2C=CF_2$ are prepared by dehydrofluorination of trifluoroalkanes having the formula $R_2CHCF_3$ wherein R is selected from hydrogen and alkyl radicals having 1–8 carbon atoms, comprising contacting said trifluoroalkanes with a fluorinated alumina catalyst at a temperature in the range of 500–1200° F., said catalyst having been prepared by the vapor-phase reaction of hydrogen fluoride, in the presence or absence of an inert gaseous diluent with eta- of gamma-alumina at about 300° F. to about 650° F.

---

This invention relates to the preparation of difluoroalkenes. In one aspect, it relates to the preparation of difluorolkenes by the catalytic dehydrofluorination of 1,1,1-trifluoroalkanes. In another aspect, it relates to the dehydrofluorination of 1,1,1-trifluoroalkanes by contacting them at elevated temperatures with fluorided alumina catalyst. In another aspect, it relates to the dehydrofluorination of a 1,1,1-trifluoroalkane by contacting it with a fluorided alumina catalyst and a fluoride of a metal at elevated temperatures. In still another aspect, it relates to the preparation of a gem-difluoroalkene by the catalytic dehydrofluorination of a 1,1,1-trifluoroalkane. In yet another aspect, it relates to a process for producing, 1,1-difluoroethylene by contacting, 1,1,1-trifluoroethane with a fluorided alumina catalyst under dehydrofluorination conditions.

Difluoroalkenes having the general formula of $R_2C=CF_2$ are commonly used as intermediates in various chemical reactions, including polymerization. One of the most commonly used members of this general group is 1,1-difluoroethylene which finds wide use in the preparation of fluoride-containing polymers. Various methods have been proposed for the manufacture of these compounds, including the reaction of acetylenic hydrocarbons with hydrogen fluoride, and the dehydrochlorination of fluorohalo alkanes.

It is an object of my invention to provide a novel process for the production of gem-difluoroalkenes. It is another object of my invention to provide a process for the dehydrofluorination of 1,1,1-trifluoroalkanes. It is yet a further object of my invention to provide a method for producing 1,1-difluoroethylene from 1,1,1-trifluoroethane.

These and other objects may be accomplished by the process of my invention, which is that gem-difluoroalkenes are produced by the vapor phase dehydrofluorination of 1,1,1-trifluoroalkane over an aluminum fluoride containing catalyst under dehydrofluorination conditions.

Other aspects, objects, and the several advantages of this invention are apparent to one skilled in the art from a study of this disclosure and the appended claims.

The trifluoroalkanes suitable for use in my invention have the general formula of $R_2CHCF_3$ wherein R is a hydrogen or an alkyl radical, preferably having 1 to 8 carbon atoms, and the total number of carbon atoms in the trifluoroalkane preferably does not exceed 10.

The said trifluoroalkane for use as a starting material can be obtained from any desirable source. For instance, it can be obtained by the reaction of hydrogen fluoride with a chlorine-containing substance such as one having the formula $R_2CHCCl_3$, $R_2CHCCl_2F$, $R_2CHCClF_2$, $R_2C=CCl_2$, or $R_2C=CClF$, where R is hydrogen or an alkyl radical as defined above. If desired, the reaction of hydrogen fluoride with the chlorine-containing substance can be carried out conveniently over the aluminum fluoride-containing catalyst used in the dehydrofluorination of the trifluoroalkane.

Examples of some trifluoroalkanes which can be employed in the process of this invention include 1,1,1-trifluoroethane, 1,1,1-trifluoropropane, 1,1,1-trifluorobutane, 1,1,1-trifluorohexane, 1,1,1-trifluorooctane, 1,1,-trifluorodecane, 1,1,1-trifluoro-2-methylpropane, 1,1,1-trifluoro-3-methylbutane, 1,1,1-trifluoro-4-ethylhexane, 1,1,1-trifluoro-2-ethylbutane, and 1,1,1-trifluoro-3,3-dimethylbutane.

Preferably, the aluminum fluoride-containing catalyst comprises fluorided eta- or gamma-alumina. If desired, the fluorided eta- or gamma-alumina can contain a fluoride of a metal such as zinc, chromium, cobalt, silver, copper, vanadium, iron, nickel, lead, antimony, or tin. The fluorided eta- or gamma-alumina is conveniently prepared by the vapor-phase reaction of hydrogen fluoride, in the presence or absence of an inert gaseous diluent, with eta- or gamma-alumina at elevated temperatures; or by impregnation with a solution of ammonium fluoride, ammonium bifluoride, or hydrogen fluoride, and subsequent heating of the impregnated catalyst. Fluorided eta- or gamma-alumina containing an additional metal fluoride of the above group can be readily prepared by incorporating the metal in some form in eta- or gamma-alumina, with subsequent fluoridation of the catalyst compositely the methods mentioned above. The metal can be incorporated in the alumina by well known methods such as grinding a salt, oxide, or other form of the metal with the alumina, or by impregnating with solutions containing the metal. Of course, fluorided eta- or gamma-alumina, or compositions which would yield fluorided eta- or gamma-alumina during the subsequent fluoridation, can be used instead of eta- or gamma-alumina itself.

Less preferably, the aluminum fluoride-containing catalyst can comprise fluorided bauxite in the presence or absence of a fluoride of a metal such as zinc, chromium, cobalt, silver, copper, vanadium, iron, nickel, lead, antimony, or tin. These catalyst compositions can be prepared through the use of bauxite by the methods described above for the preparation of catalysts from eta- or gamma-alumina.

The difluoroalkenes produced by the process of my invention have the general formula $R_2C=CF_2$ wherein R is a hydrogen or an alkyl radical preferably having 1 to 8 carbon atoms, and the total number of carbon atoms in the difluoroalkene preferably does not exceed 10.

Examples of some difluoroalkenes which can be produced by the process of this invention include 1,1-difluoroethylene, 1,1-difluoropropene, 1,1-difluoro-1-butene, 1,1-difluoro-1-hexene, 1,1-difluoro-1-octene, 1,1-difluoro-1-decene, 1,1 - difluoro - 2 - methylpropene, 1,1-difluoro-3-methyl-1-butene, 1,1-difluoro-4-ethyl-1-hexene, 1,1-difluoro-2-ethyl-1-butene, and 1,1-difluoro - 3,3 - dimethyl-1-butene.

Although the reaction temperature employed in the dehydrofluorination process of this invention can be varied over a wide range, it will generally be within the range of about 500–1200° F., usually being within the range of about 800–1000° F. The flow rate of the trifluoroalkane, expressed as the flow rate of the trifluoroalkane in the gaseous state, will generally be within the range of about 5–500 volumes (standard conditions) per volume of catalyst per hour, usually being within the range of about 10–200 volumes (standard conditions) per volume of catalyst per hour. If desired, an additional amount of an inert diluent or carrier such as nitrogen, helium, argon, or the like can be present with the trifluoroalkane. Although the total pressure is conveniently maintained at substantially atmospheric, pressures somewhat above or below atmospheric can be employed. Usually the total pressure will be within the range of about 0.1–10 atmospheres, preferably being within the range of about 0.5–5 atmospheres.

The difluoroalkene is readily separated from other components of the effluent from the dehydrofluorination process by conventional techniques such as distillation, chromatography, and the like, preferably after removal of hydrogen fluoride, e.g., with water or an aqueous solution of caustic.

EXAMPLE

A fluorided alumina catalyst was prepared by the method of the invention in Serial No. 398,442 filed Sept. 22, 1964, now Patent No. 3,413,360. A dry stream of hydrogen fluoride containing 50 volume percent nitrogen was passed over 200 ml. of dried gamma-alumina in the form of ⅛-inch pills. The flow rate of the gaseous mixture was 200 volumes per volume of catalyst per hour. The initial temperature of the catalyst was about 300° F. The gaseous mixture was passed through the catalyst bed for 4 hours, during which time a hot reaction zone at a maximum temperature of about 650° F. moved through the bed. The resulting fluorided alumina catalyst contained 51.6 weight percent fluorine and had a surface area of 25 square meters per gram.

Metered gaseous streams of 1,1-difluoro-1-chloroethane and hydrogen fluoride were passed at atmospheric pressure through a 1-in. x 12-in. tubular reactor packed with 100 ml. of the fluorided alumina catalyst prepared above. The total flow rate of the two gaseous streams was 120 volumes per volume of catalyst per hour, the molar ratio of hydrogen fluoride to 1,1-difluoro-1-chloroethane being 3.5 to 1. The catalyst temperature was maintained at 610–615° F. Excess hydrogen fluoride in the reactor effluent was removed with aqueous caustic, and the hydrogen fluoride-free product was dried and collected continuously in a cold trap. The operation was continued until 131 g. of product was collected. Gas chromatographic analysis of the dried, hydrogen fluoride free product showed this product contained 97.1 weight percent 1,1,1-trifluoroethane, 0.7 weight percent 1,1-difluoro-1-chloroethane, 1.8 weight percent 1,1-dichloroethylene, 0.3 weight percent 1-fluoro-1-chloroethylene, and 0.1 weight percent unidentified material.

The above mixture of products containing 97.1 weight percent 1,1,1-trifluoroethane was allowed to vaporize from a container placed in an ice bath. The vapor phase, containing about 99.1 weight percent 1,1,1-trifluoroethane, was passed for 2 hours over the 100 ml. of fluorided alumina catalyst used above. The flow rate of the gas was 23 volumes per volume of catalyst per hour. The catalyst was maintained at about 900° F. Hydrogen fluoride was removed from the effluent by use of aqueous caustic, and the product was then dried. Gas chromatographic analysis of the dried, hydrogen fluoride-free product showed this product contained 21.1 weight percent 1,1-difluoroethylene, 77.4 weight percent 1,1,1-trifluoroethane, and 1.5 weight percent unidentified material.

Reasonable variation and modification are possible within the scope of the foregoing disclosure and the appended claims to the invention, the essence of which is that a difluoroalkene is produced by the dehydrofluorination of a trifluoroalkane over an aluminum fluoride containing catalyst under dehydrofluorination conditions.

I claim:

1. A process of dehydrofluorinating a trifluoroalkane having the formula $R_2CHCF_3$ wherein R is selected from hydrogen and alkyl radicals having 1–8 carbon atoms and wherein said trifluoroalkane contains no more than 10 carbon atoms, comprising contacting said trifluoroalkane with a fluorided alumina catalyst under dehydrofluorination conditions at a temperature in the range 500–1200° F. and a flow rate of reactants in the range 5–500 volumes of trifluoroalkane/volume catalyst/hour to convert at least a portion of said trifluoroalkane to the corresponding difluoroalkene, said catalyst having been prepared by the vapor-phase reaction of hydrogen fluoride, in the presence or absence of an inert gaseous diluent, with eta- or gamma-alumina at temperatures between about 300° F. to about 650° F.

2. Process of claim 1 wherein said fluorided alumina contains a fluoride of a metal selected from zinc, chromium, cobalt, silver, copper, vanadium, iron, nickel, lead, antimony and tin.

3. Process of claim 1 wherein said trifluoroalkane is 1,1,1-trifluoroethane and wherein said difluoroalkene is 1,1-difluoroethylene.

4. Process of claim 1 wherein said contacting occurs at a temperature of 800° F. to 1000° F., and the rate of said contacting is in the range of 10 to 200 volumes of trifluoroalkane per volume of catalyst per hour and wherein said contacting is conducted at a pressure of 0.1 to 10 atmospheres.

5. Process of claim 1 wherein said catalyst had been previously formed by the vapor-phase reaction of alumina with HF with nitrogen as diluent, and said trifluoroalkane is 1,1,1-trifluoroethane and said difluoroalkene is 1,1-difluoroethylene.

References Cited

FOREIGN PATENTS 704,720    3/1965    Canada.

DANIEL D. HORWITZ, Primary Examiner